United States Patent
Li et al.

(10) Patent No.: US 9,078,119 B2
(45) Date of Patent: Jul. 7, 2015

(54) METHOD AND SYSTEM FOR ACQUIRING INFORMATION OF MACHINE TYPE COMMUNICATION USER EQUIPMENT

(75) Inventors: Zhijun Li, Shenzhen (CN); Zhihai Wang, Shenzhen (CN); Xiaofeng Shi, Shenzhen (CN); Baoguo Xie, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 395 days.

(21) Appl. No.: 13/508,328

(22) PCT Filed: Nov. 4, 2010

(86) PCT No.: PCT/CN2010/078405
§ 371 (c)(1), (2), (4) Date: May 4, 2012

(87) PCT Pub. No.: WO2011/054299
PCT Pub. Date: May 12, 2011

(65) Prior Publication Data
US 2012/0220326 A1 Aug. 30, 2012

(30) Foreign Application Priority Data
Nov. 6, 2009 (CN) .......................... 2009 1 0221261

(51) Int. Cl.
*H04B 7/00* (2006.01)
*H04W 8/22* (2009.01)
*H04W 4/00* (2009.01)
*H04W 60/00* (2009.01)
(Continued)

(52) U.S. Cl.
CPC ................ *H04W 8/22* (2013.01); *H04W 4/005* (2013.01); *H04W 60/00* (2013.01); *H04W 88/16* (2013.01); *H04W 92/24* (2013.01)

(58) Field of Classification Search
CPC ..... H04W 4/005; H04W 60/00; H04W 88/16; H04W 8/22; H04W 92/24
See application file for complete search history.

(56) References Cited

U.S. PATENT DOCUMENTS

| 2007/0169107 | A1* | 7/2007 | Huttunen | 717/174 |
|---|---|---|---|---|
| 2008/0039104 | A1* | 2/2008 | Gu et al. | 455/445 |
| 2008/0153512 | A1 | 6/2008 | Kale et al. | |

(Continued)

FOREIGN PATENT DOCUMENTS

| CN | 101511076 | 8/2009 |
|---|---|---|
| WO | 2009122219 | 10/2009 |

OTHER PUBLICATIONS

ISR for related PCT/CN2010/078405 mailed on Feb. 17, 2011 and its English-language translation.

(Continued)

*Primary Examiner* — Edward Urban
*Assistant Examiner* — Mohammed Rachedine
(74) *Attorney, Agent, or Firm* — Ladas & Parry, LLP

(57) ABSTRACT

A method and a system for acquiring information of Machine Type Communication (MTC) user equipment (UE) are provided. The method comprises the steps of: an MTC GateWay (MTC GW) acquiring the information of the MTC UE which currently requests to attach to a network or has attached to a network from a mobility management network element; the MTC GW sending the information of the MTC UE acquired from the mobility management network element to an MTC Server. The method and the system can control the MTC UE in real time and intelligently.

18 Claims, 6 Drawing Sheets

(51) Int. Cl.
 *H04W 88/16* (2009.01)
 *H04W 92/24* (2009.01)

(56) References Cited

U.S. PATENT DOCUMENTS

2008/0233922 A1    9/2008  Lesrel
2009/0285183 A1*  11/2009  Wu et al. .................... 370/331
2010/0125899 A1*   5/2010  Tinnakornsrisuphap
                           et al. ............................ 726/12

OTHER PUBLICATIONS

IPRP/WO for related PCT/CN2010/078405 issued on May 8, 2012 and its English-language translation.

Office Action issued for a related Chinese Application No. 200910221261.5 dated Dec. 28, 2012 and its English translation by Google Translator Toolkit and Google Translate.

* cited by examiner

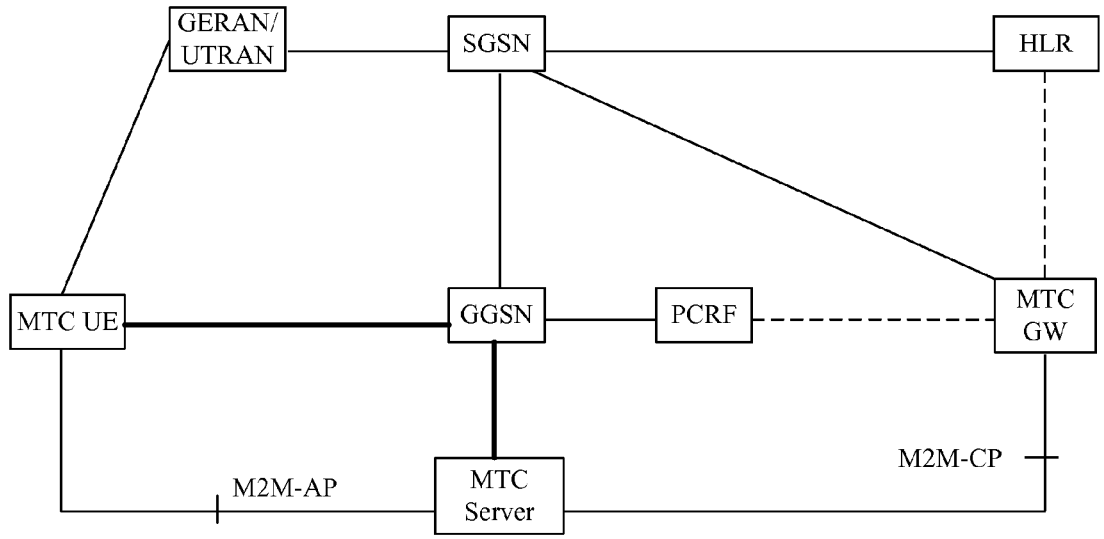
Fig. 5
an MTC GW acquires the information of an MTC UE which currently requests to attach to a network or has attached to a network through the mobility management network element — S601
the MTC GW sends the information of the MTC UE acquired from the mobility management network element to the MTC Server — S603
Fig. 6
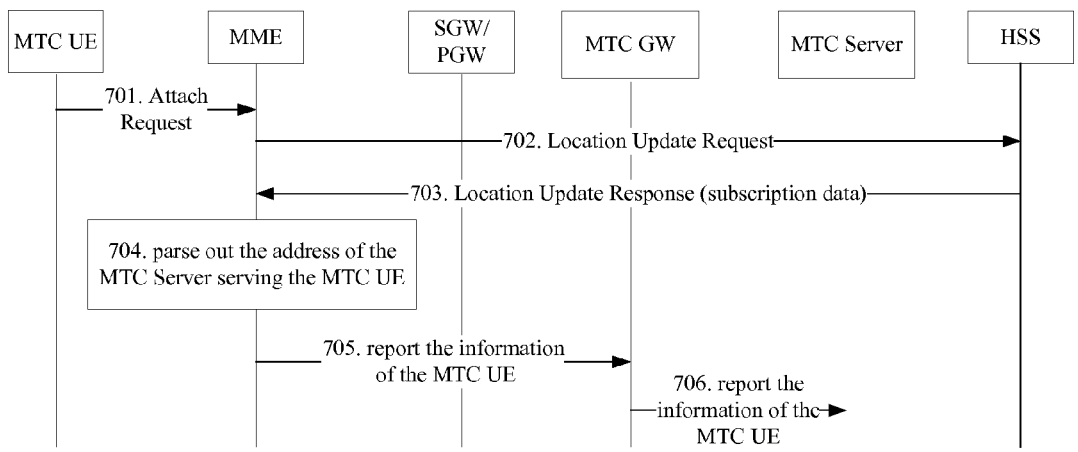
Fig. 7

METHOD AND SYSTEM FOR ACQUIRING INFORMATION OF MACHINE TYPE COMMUNICATION USER EQUIPMENT

CROSS-REFERENCE TO RELATED APPLICATIONS

This application is the U.S. National Stage of International Patent Application No. PCT/CN2010/078405 filed on Nov. 4, 2010 which claims priority to Chinese Patent Application No. 200910221261.5 filed on Nov. 6, 2009, the disclosure of which are hereby incorporated by reference in their entireties.

FIELD OF THE INVENTION

The present invention relates to the field of communication, and in particular to a method and a system for acquiring information of a Machine Type Communication (MTC) User Equipment (UE).

BACKGROUND OF THE INVENTION

In conventional mobile network services, Human To Human (H2H) communication occupies the main position. In the H2H communication, since two participating parties are the human being having behavior control capability, a session actually is controlled by the behavior of the human being. With the development of mobile network services and automation control technology, at present, a new mobile communication mode, i.e. Machine To Machine (M2M) communication, appears, in which two parties of the communication are machine equipment.

A narrow definition of the M2M is the communication from machine to machine, however, broadly speaking, the M2M includes networking applications and services with intelligent interaction of machine terminals as the core. The M2M can provide, based on an intelligent machine terminal, an information solution for a client with multiple communication modes as access means, so as to meet the information requirement of the client on monitoring, commanding and dispatching, data collection and measurement and so on. The M2M can be applied to industry applications (for example, traffic monitoring, alarm system, sea rescue, vending machine, driving payment and so on), home applications (for example, automatic meter reading, temperature control and so on) and personal applications (for example, life detection, remote diagnosis and so on) and the like.

Different from the H2H communication, the communication objects of the M2M are machines, and the communication behavior is automatically controlled, that is to say, initiation and termination of the communication and control of some admissions and limits during the communication procedure are automated behaviors. These behaviors depend on the restriction and control on the behavior of machines in the M2M communication (that is, terminals in the M2M communication), wherein the behavior of the terminals in the M2M communication are restricted by service subscription data and the network manages the terminals in the M2M communication according to the service subscription data.

The M2M communication also is called MTC, and the most typical example thereof is the communication between a terminal and an application server, wherein the terminal is called an MTC User Equipment (MTC UE) and the application server is called an MTC Server.

In the access of 2G/3G/Long Term Evolution (LTE), the M2M communication mainly takes a Packet Service (PS) network as an underlying bearer network to realize the service layer communication between the MTC UE and the MTC Server. FIG. 1 shows an architecture schematic diagram of the access of M2M communication entities to an Evolved Packet System (EPS).

In FIG. 1, the underlying bearer network comprises: an Evolved Universal Terrestrial Radio Access Network (E-UTRAN), a Mobility Management Entity (MME), a Serving GateWay (S-GW or SGW), a Packet Data Network GateWay (PDN GW or P-GW or PGW), a Home Subscriber Server (HSS) and a Policy and Charging Rules Function (PCRF), wherein the main network element of the E-UTRAN is Evolved NodeB (eNodeB).

In FIG. 1, the MME takes charge of the related work of control plane, such as mobility management, process of non-access layer signaling and context management in user mobility management; the S-GW is an access gateway device which is connected to the E-UTRAN, and is configured to forward data between the E-UTRAN and the P-GW and take charge of the caching of paging waiting data; the P-GW is a border gateway between the EPS and Packet Data Network (PDN) and takes charge of functions such as the access of the PDN and the data forwarding between the EPS and the PDN and so on; the PCRF is a policy and charging rules function entity which is connected with an operator Internet Protocol (IP) service network through a receiving interface Rx to acquire service information, in addition, the PCRF can be coupled with a gateway device in the network through a Gx interface to take charge of initiating establishment of IP bearer, guarantee the Quality of Service (QoS) of service data and perform charging control; and the HSS provides management of user subscription data and management of important context information about access of the user to a network.

In FIG. 1, the MTC UE accesses the EPS network through the E-UTRAN (eNodeB); after an IP address is allocated, an IP channel can be established between the MTC UE and the MTC Server to realize an upper layer service communication between the MTC UE and the MTC Server. The IP channel established between the MTC UE and the MTC Server is a logic IP channel, the physical path of which passes through the eNodeB, the S-GW and the P-GW.

At present, a method to realize the M2M communication is to establish a service layer interface protocol on the IP channel between the MTC UE and the MTC Server, through the service layer interface protocol, service data are interacted between the MTC UE and the MTC Server, meanwhile, the MTC Server also realizes the control of the MTC UE through the service layer interface protocol.

FIG. 2 shows a flow of realizing the M2M communication by using the method above. As shown in FIG. 2, in the method, the procedure that an MTC UE accesses through a PS network and establishes communication connection with an MTC Server mainly comprises the following steps.

S201: the MTC UE initiates an Attach Request to an MME.

S202: the MME receives the Attach Request above and sends a Location Update Request to the HSS. In this step, the HSS downloads subscription data of the MTC UE to the MME, wherein the subscription data include the subscription data part used for M2M access control.

S203: the MME sends a bearer establishment request to an SGW/PGW to request the SGW/PGW to establish a proper bearer for the MTC UE.

S204: if the PGW needs to acquire policy data from a PCC to establish a proper bearer according to the policy data, the PGW interacts with the PCC to acquire the PCC policy.

S205: the PGW establishes a bearer for the MTC UE and returns a bearer establishment response.

S206: the MME sends an Attach Response to the MTC UE.

After step S206, the MTC UE attaches to the PS network and is allocated with an IP address and has a proper bearer established, thus the MTC UE is able to initiate registration of a service layer to the MTC Server.

S207: the MTC UE initiates registration of the service layer to the MTC Server.

S208: the MTC Server accepts the registration of the MTC UE and returns a registration response.

S209: service data interaction with the MTC Server is performed by the MTC UE through a service layer protocol.

Through the flow shown in FIG. 2, the MTC UE accesses the PS network and establishes an IP connection with the MTC Server, thus the MTC UE can realize the subsequent service layer communication with the MTC Server. In the flow, since the MTC Server has no relation with the underlying access layer (refer to the network elements such as MME/SGW/PGW), the MTC Server can not acquire events occurring in the underlying access layer, thus the MTC Server can not judge whether the behavior of the MTC UE is normal according to these events. Therefore, some M2M services requiring the service layer to have higher control right (for example, the M2M communication with high availability, the M2M communication with intelligent management capability, etc.) can not be realized by using the access method above.

For example, in some M2M communications with high availability, for the purpose of performing intelligent management and real-time monitoring to an MTC UE, the MTC Server requires to regularly check the condition of the MTC UE accessing the network to confirm that the operation of the MTC UE is normal and no failure occurs. In another aspect, if the behavior of the MTC UE accessing the network is abnormal, the MTC Server needs to learn the abnormal condition in time so as to notify the M2M operation and maintenance personnel to perform on-site maintenance in time. Or, in a condition that the equipment might be stolen, the MTC Server needs to have the capability of detecting the probable condition of equipment being stolen and system being misappropriated in time, so as to respond in time.

Particularly, in the M2M communication with higher demand on intelligent management and real-time monitoring, in order to meet higher management requirement, the MTC Server probably needs to acquire the condition of the MTC UE accessing the network in time; typically, the MTC Server probably needs to acquire the following information related to the MTC UE:

(A) regular access monitoring: for some services, it is required to limit the time when the MTC UE accesses the network, if the access to the network occurs at a forbidden time, the MTC Server needs to learn the condition in time;

(B) area access limit: for some services, it is required to limit the location area from which the MTC UE accesses the network, if the access to the network occurs at a forbidden location area, the MTC Server needs to learn the condition in time;

(C) mobility limit: for some services, the MTC UE is allowed to move in a preset area only, or the MTC UE is not allowed to move frequently, if the forbidden mobility behaviors above occur, the MTC Server needs to learn the condition in time;

(D) SIM misappropriation check: since the fee of the M2M communication probably is lower than that of general mobile communication, if the SIM card of the MTC UE is misappropriated, the service operator would suffer great loss; in order to prevent the occurrence of these conditions, the service operator probably requires to bind the International Mobile Subscriber Identification Number (IMSI) in the SIM card and International Mobile Equipment Identity (IMEI) of the MTC UE, that is, one IMSI can only be used by the MTC UE with one specified IMEI. In this condition, the MTC server needs to verify the binding of the IMSI and the IMEI of the MTC UE.

For the service requirements above, the related information of the MTC UE can only be acquired by the underlying access layer, in the E-UTRAN access, only the MME can acquire and judge necessary information. From the architecture of the present M2M communication (refer to the communication between the MTC UE and the MTC Server) accessing the EPS, the occurrence of the limit conditions above is generated in the access layer (for example, MME, PGW), and the service layer (for example, MTC Server) can not acquire the information. Also, for a location sensitive service, the service layer (for example, MTC Server) dose not know the information of the current exact location of the MTC UE and the occurrence of location event (cell handover), however, the information must be provided by the underlying access layer, therefore, in prior art, the MTC Server can not realize the real-time control and intelligent control of the MTC UE.

Besides, in some condition, the MTC Server might not be operated by an operator and the deployment point generally is not in a core network, thus, a threat would be caused to the security of the core network when the MTC Server acquires information from the core network side.

SUMMARY OF THE INVENTION

The present invention is disclosed to overcome the problems in prior art that the MTC Server can not realize real-time control and intelligent control of the MTC UE since the MTC Server can not acquire the information of the MTC UE or the core network is not safe since the MTC Server acquires information from the core network, therefore, the present invention provides a method for acquiring information of an MTC UE so as to solve at least one of the problems above.

In order to realize the object above, according to one aspect of the present invention, a method for acquiring information of the MTC UE is provided. The method is applied to a system comprising a mobility management network element, an MTC GateWay (MTC GW) and an MTC Server, wherein the mobility management network element is coupled with the MTC GW and the MTC GW is coupled with the MTC Server.

The method for acquiring the information of the MTC UE according to the present invention comprises the steps of: the MTC GW acquiring the information of the MTC UE which currently requests to attach to a network or has attached to a network through the mobility management network element; the MTC GW sending the information of the MTC UE acquired from the mobility management network element to the MTC Server.

Preferably, the step of the MTC GW acquiring the information of the MTC UE through the mobility management network element comprises the steps of: the mobility management network element reporting the information of the MTC UE to the MTC GW; and the MTC GW acquiring the information of the MTC UE reported by the mobility management network element.

Preferably, the step of the mobility management network element reporting the information of the MTC UE to the MTC GW comprises the step of: the mobility management network element reporting, according to the indication of subscription data of the MTC UE acquired from a user subscription data repository, the information of the MTC UE to the MTC GW.

Preferably, the subscription data comprise information of the MTC Server serving the MTC UE.

Preferably, the subscription data further comprise: first indication information which indicates the mobility management network element to report the information of the MTC UE;

the step of the mobility management network element reporting the information of the MTC UE to the MTC GW comprises the step of: the mobility management network element reporting, after receiving a Location Update Response, the information of the MTC Server and the information of the MTC UE to the MTC GW according to indication of the first indication information comprised in the subscription data;

the step of the MTC GW sending the acquired information of the MTC UE to the MTC Server comprises the step of: the MTC GW acquiring the address of the MTC Server according to the information of the MTC Server and sending the information of the MTC UE to the MTC Server.

Preferably, the subscription data further comprise: second indication information which indicates the mobility management network element to send an event report to the MTC Server when a predetermined event occurs at the MTC UE;

the step of the mobility management network element reporting the information of the MTC UE to the MTC GW comprises the step of: the mobility management network element sending, when detecting that the predetermined event occurs at the MTC UE, an event report to the MTC GW according to indication of the second indication information, wherein the event report carries current information of the MTC UE.

Preferably, the predetermined event comprises one or any combination of the following: change of subscription data of the MTC UE; change of a location of the MTC UE; change of a state of the MTC UE; change of a network of the MTC UE; and changes of International Mobile Subscriber Identification Number (IMSI) and International Mobile Equipment Identity (IMEI) used by MTC UE.

Preferably, before the step of the mobility management network element reporting the information of the MTC UE to the MTC GW, the method further comprises the steps of: the MTC GW sending, after the MTC UE attaches to a network, an inquiry request to the mobility management network element; and the mobility management network element receiving the inquiry request.

Preferably, the step of the MTC GW sending the inquiry request to the mobility management network element comprises the steps of: the MTC Server sending, when determining that it is required to acquire the information of the MTC UE, an inquiry request to the MTC GW; the MTC GW receiving the inquiry request and acquiring an address of the mobility management network element allocated to the MTC UE; and the MTC GW sending the inquiry request to the mobility management network element.

Preferably, the step of the MTC GW acquiring the address of the mobility management network element allocated to the MTC UE comprises the step of: the MTC GW acquiring the address of the mobility management network element according to a corresponding relationship acquired in advance among an identifier of the MTC UE, the address of the mobility management network element allocated to the MTC UE and an address of the MTC Server serving the MTC UE.

Preferably, the MTC Server determines that it is required to acquire the information of the MTC UE in one of the following conditions that: the MTC Server requires to detect whether a Subscriber Identity Module (SIM) card provided for the MTC UE is misappropriated; the MTC Server requires to judge whether the MTC UE accesses from a forbidden location area; the MTC Server requires to judge whether the MTC UE moves to a forbidden location area; the MTC Server requires to judge whether the MTC UE accesses at a forbidden time; and the MTC Server requires to judge whether the time of the MTC UE accessing a network exceeds a predetermined time length.

Preferably, after the step of the MTC GW receiving the inquiry request and before the step of the MTC GW acquiring the address of the mobility management network element, the method further comprises the step of: the MTC GW judging, according to information of MTC Servers which are allowed to access by the core network acquired in advance, that the MTC Server is in a scope of the MTC Servers which are allowed to access.

Preferably, the inquiry request is used to inquire about the information of the MTC UE; the step of the mobility management network element reporting the information of the MTC UE to the MTC GW comprises the step of: the mobility management network element acquiring, after receiving the inquiry request, the current information of the MTC UE and reporting the acquired information of the MTC UE to the MTC GW.

Preferably, the inquiry request is used to request the mobility management network element to send an event report to the MTC GW when a predetermined event occurs at the MTC UE; the step of the mobility management network element reporting the information of the MTC UE to the MTC GW comprises the step of: the mobility management network element sending, when the predetermined event occurs at the MTC UE, an event report to the MTC GW, wherein the event report carries current information of the MTC UE.

Preferably, the predetermined event comprises one or any combination of the following: change of subscription data of the MTC UE; change of a state of the MTC UE; change of a network of the MTC UE; and change of a location of the MTC UE.

Preferably, the step of the MTC GW sending the information of the MTC UE acquired from the mobility management network element to the MTC Server comprises the steps of: the MTC GW acquiring an address of the MTC Server serving the MTC UE; and the MTC GW sending, to the MTC Server, an event report or the information of the MTC UE reported by the mobility management network element, wherein the event report carries the information of the MTC UE.

Preferably, the step of the MTC GW acquiring the address of the MTC Server serving the MTC UE comprises the step of: the MTC GW acquiring the address of the MTC Server according to a corresponding relationship acquired in advance among an identifier of the MTC UE, an address of the mobility management network element allocated to the MTC UE and the address of the MTC Server serving the MTC UE.

Preferably, the step of the MTC GW acquiring the corresponding relationship comprises the steps of: the MTC Server receiving a registration message sent by the MTC UE, wherein the registration message carries identifier information of the mobility management network element allocated to the MTC UE; the MTC Server sending a registration notification to the MTC GW, wherein the registration notification carries parameters which comprise: identifier information of the MTC UE, identifier information of the MTC Server and identifier information of the mobility management network element; and the MTC GW parsing to acquire the corresponding relationship according to the parameters carried in the registration notification.

Preferably, the identifier information of the MTC UE comprises: an identifier of the MTC UE and/or an IP address of the MTC UE; the identifier information of the MTC Server comprises: a serving identifier of the MTC Server and/or an IP address of the MTC Server.

Preferably, the step of the MTC GW acquiring the corresponding relationship comprises the steps of: the mobility management network element sending, during a process of the MTC UE initiating an attachment, a notification message to the MTC GW, wherein the notification message carries identifier information of the MTC UE and identifier information of the mobility management network element allocated to the MTC UE; the MTC Server serving the MTC UE sending, after receiving a registration request message from the MTC UE, a registration notification message to the MTC GW, wherein the registration notification message carries the identifier information of the MTC UE and the identifier information of the MTC Server; and the MTC GW acquiring the corresponding relationship according to the notification message and the registration notification message.

Preferably, during the process of the MTC UE initiating the attachment, the method further comprises the steps of: the mobility management network element receiving subscription data of the MTC UE transmitted by a user subscription data repository, wherein the subscription data comprise the identifier information of the MTC Server serving the MTC UE; then the notification message sent by the mobility management network element further carries the identifier information of the MTC Server; the MTC GW parsing to acquire the corresponding relationship according to the notification message.

Preferably, the identifier information of the MTC UE comprises: an identifier of the MTC UE and/or an IP address of the MTC UE; the identifier information of the mobility management network element comprises: an identifier of the mobility management network element and/or an IP address of the mobility management network element; and the identifier information of the MTC Server comprises: a serving identifier of the MTC Server and/or an IP address of the MTC Server.

Preferably, the MTC GW is coupled with the user subscription data repository; the step of the MTC GW acquiring the corresponding relationship comprises the steps of: the MTC Server sending, when the MTC UE attaches to the network and initiates registration to the MTC Server, a registration notification message to the MTC GW, wherein the registration notification message carries identifier information of the MTC UE and identifier information of the MTC Server; the MTC GW acquiring an address of the mobility management network element allocated to the MTC UE by querying the user subscription data repository; and the MTC GW parsing to acquire the corresponding relationship.

Preferably, the user subscription data repository comprises: a Home Location Register (HLR) or a Home Subscriber Server (HSS).

Preferably, the information of the MTC UE comprises one or any combination of the following: current service subscription data of the MTC UE; an IMSI and an IMEI used by the MTC UE; and context information of the MTC UE on the mobility management network element.

Preferably, the context information of the MTC UE on the mobility management network element comprises: current location area information of the MTC UE, and/or, current state information of the MTC UE.

Preferably, the mobility management network element comprises: a Serving General Packet Radio Service Supporting Node (SGSN) or a Mobility Management Entity (MME).

In order to realize the object above, according to another aspect of the present invention, a system for acquiring the information of the MTC UE is provided.

The system for acquiring the information of the MTC UE according to the present invention comprises: a user subscription data repository, an MTC GW, a mobility management network element and an MTC Server, wherein the user subscription data repository is configured to store subscription data of the MTC UE in the system; the mobility management network element is coupled with the user subscription data repository and is configured to receive the subscription data, transmitted by the user subscription data repository, of the MTC UE which currently requests to attach to a network or has attached to a network, and provide the information of the MTC UE to the MTC GW; the MTC GW is coupled with the mobility management network element and is configured to send the information of the MTC UE acquired from the mobility management network element to the MTC Server; and the MTC Server is coupled with the MTC GW and is configured to receive the information of the MTC UE sent by the MTC GW.

Preferably, the MTC GW is further coupled with the user subscription data repository and is configured to acquire the subscription data of the MTC UE or an address of the mobility management network element allocated to the MTC UE from the user subscription data repository.

Preferably, the MTC GW is further configured to perform security verification for the MTC Server.

In accordance with the present invention, the MTC Server acquires the information of the MTC UE from the mobility management network element through the MTC GW, therefore, the problems that the MTC Server can not acquire the information of the MTC UE in the access layer and thus can not perform real-time control and intelligent control for the MTC UE are solved; in addition, in accordance with the present invention, since the MTC Server acquires the information of the MTC UE from the mobility management network element through the MTC GW, the security of the core network is guaranteed.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein:

FIG. 5 shows an architecture diagram of the MTC UE accessing through a General Packet Radio Service (GPRS) system to realize the M2M communication in accordance with Embodiment 2 of the present invention;

FIG. 6 shows a flowchart of a method for acquiring the information of the MTC UE in accordance with an embodiment of the present invention;

FIG. 7 shows a flowchart of an MME actively reporting the information of the MTC UE to the MTC Server in accordance with an embodiment of the present invention;

DETAILED DESCRIPTION OF THE EMBODIMENTS

In prior art, no matter whether the MTC UE realizes the M2M communication by accessing through the EPS network or through the GPRS network, the MTC Server can not acquire the related information of the access layer of the MTC UE, thus the MTC Server can not realize the intelligent management or real-time monitoring of the MTC UE. In addition, since the MTC Server might not be the MTC Server configured by an operator in specific application, even though the MTC Server can directly acquire the information of the MTC UE from the access layer, a threat is probably caused to the security of the network core. In view of the problems above, the embodiments of the present invention provide a solution for acquiring the information of the MTC UE. In the embodiments of the present invention, the MTC Server is coupled with an MTC GW, the MTC GW is coupled with a mobility management network element (the mobility management network element is an MME when the MTC UE accessing the E-UTRAN network, or a Serving General Packet Radio Service Support Node (SGSN) when the MTC UE accessing the GSM/EDGE Radio Access Network (GERAN)/UTRAN network), the MTC GW acquires the related information of the access layer of the MTC UE through the mobility management network element and sends the acquired related information of the MTC UE to the MTC Server so that the MTC Server can control the MTC UE according to the acquired information.

The present invention is described below in detail by reference to the accompanying figures in conjunction with embodiments. It should be noted that the embodiments and the characteristics of the embodiments in the application can be combined with each other if there is no conflict.

According to an embodiment of the present invention, a control system of an MTC UE is provided.

Figure 1:
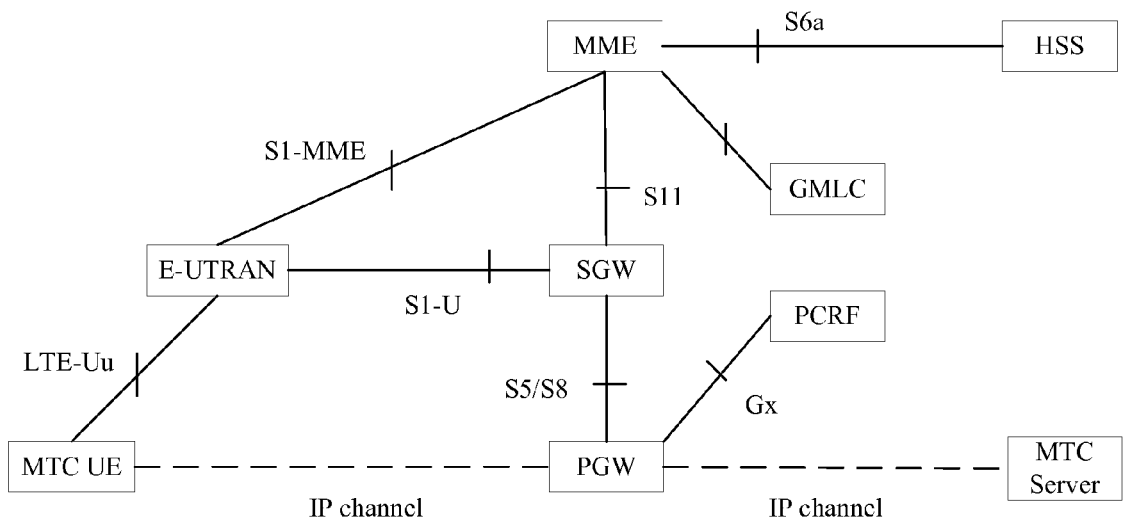
FIG. 1 shows an architecture schematic diagram of the access of M2M communication entities to EPS in related art.
Figure 2:
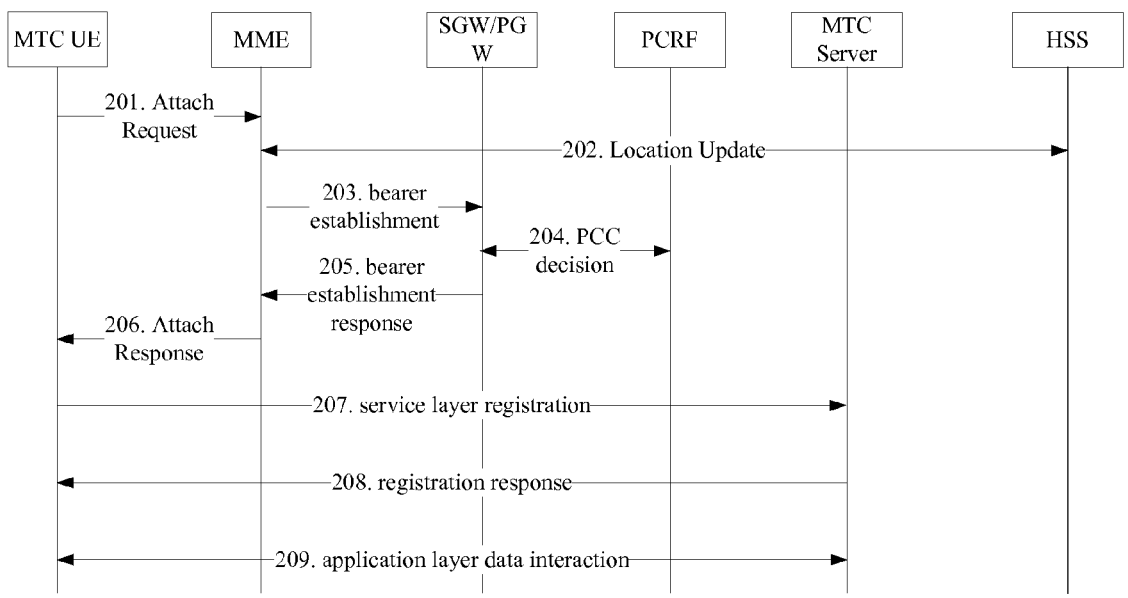
FIG. 2 shows a flowchart of the MTC UE accessing through a PS network and establishing a communication connection with the MTC Server in related art.
Figure 3:
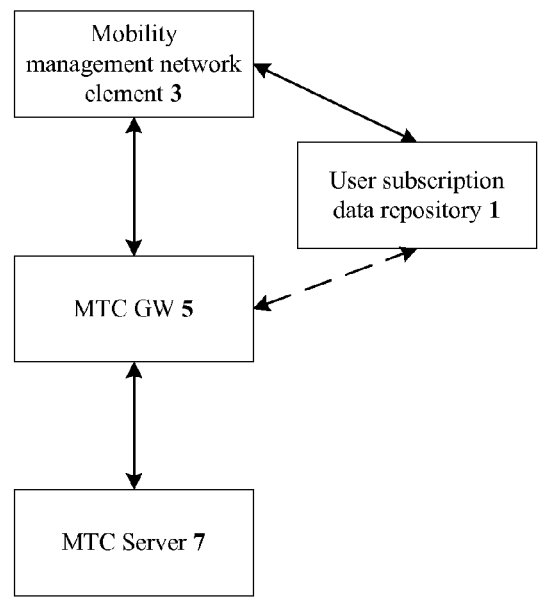
FIG. 3 shows a structure diagram of a system for acquiring the information of the MTC UE in accordance with an embodiment of the present invention.

FIG. 3 shows a structure diagram of the control system of the MTC UE according to an embodiment of the present invention. As shown in FIG. 3, the control system of the MTC UE according to the embodiment of the present invention mainly comprises: a user subscription data repository 1, a mobility management network element 3, an MTC GW 5 and an MTC Server 7. Each network element above is described below respectively.

The user subscription data repository 1 is configured to store subscription data of the MTC UE in the system.

The mobility management network element 3 is coupled with the user subscription data repository 1 and is configured to receive the subscription data, transmitted by the user subscription data repository 1, of the MTC UE which currently requests to attach to a network or has attached to a network, and provide the information of the MTC UE to the MTC GW 5.

In specific application, when the MTC UE requests to attach to a network, the MTC UE sends an Attach Request to the mobility management network element 3; after receiving the Attach Request of the MTC UE, the mobility management network element 3 sends a Location Update Request to the user subscription data repository 1; after receiving the Location Update Request, the user subscription data repository 1 transmits the subscription data of the MTC UE to the mobility management network element 3, then the mobility management network element 3 receives and stores the subscription data. After the MTC UE attaches to the network, if the subscription data of the MTC UE changes, the user subscription data repository 1 transmits the updated subscription data of the MTC UE to the mobility management network element 3.

The MTC GW 5 is coupled with the mobility management network element 3 and is configured to acquire the information of the MTC UE above from the mobility management network element 3 and send the acquired information of the MTC UE to the MTC Server 7.

The MTC Server 7 is coupled with the MTC GW 5 and is configured to receive the information of the MTC UE sent by the MTC GW 5.

Besides, after receiving the information of the MTC UE, the MTC Server 7 can flexibly control the service of the MTC UE through the IP network connected with the MTC UE according to the information of the MTC UE.

In the embodiment of the present invention, on the present architecture, the MTC GW 5 is added and an interface is added between the MTC GW 5 and the mobility management network element 3 so that communication can be performed between the MTC GW 5 and the mobility management network element 3, meanwhile, an interface is added between the MTC GW 5 and the MTC Server 7 so that communication can be performed between the MTC GW 5 and the MTC Server 7.

In specific application, the MTC GW 5 is further configured to perform security verification for the MTC Server 7, for an illegal MTC Server 7, the MTC GW 5 does not allow the interaction of the illegal MTC Server 7 with the core network.

In implementation, the information (for example, service identifier, IP address, etc.) of the MTC Servers allowed to have access by the core network can be configured in the MTC GW 5, or, the MTC GW 5 also can acquire the information of the MTC Servers allowed to have access from the core network. After receiving a request sent by the MTC Server, the MTC GW checks whether the MTC Server requesting to serve is in the scope of the MTC Servers allowed to have access, if yes, the MTC GW processes the request, otherwise, the MTC GW refuses the request.

Further, as shown in FIG. 3, the MTC GW 5 also can be directly coupled with the user subscription data repository 1, that is, there is an interconnecting interface existing between the MTC GW 5 and the user subscription data repository 1, so that the MTC GW 5 can acquire from the user subscription data repository 1 the address of the mobility management network element 3 allocated to the MTC UE.

In specific application, after the MTC UE attaches to a network, the MTC UE initiates registration to the MTC Server 7 through the network; after receiving the registration request, the MTC Server 7 sends a registration notification to the MTC GW 5; after receiving the registration notification, the MTC GW 5 can acquire the address of the mobility management network element 3 allocated to the MTC UE through the interface between the MTC GW 5 and the user subscription data repository 1, or can acquire the address of the mobility management network element allocated to the MTC UE through the interface between the MTC GW 5 and the user subscription data repository 1 while simultaneously acquiring the subscription data of the MTC UE through the interface, then, according to the acquired address of the mobility management network element 3, the MTC GW 5 can acquire the information of the MTC UE from the mobility management network element 3 corresponding to the acquired address.

For example, when the MTC UE accesses the E-UTRAN network, the user subscription data repository 1 is an HSS and the mobility management network element 3 is an MME; when the MTC UE accesses the GERAN/UTRAN network, the user subscription data repository 1 is a Home Location Register (HLR) and the mobility management network element 3 is an SGSN.

The system provided by the embodiment of the present invention is illustrated below by specific embodiments.

Embodiment 1

The embodiment is described by taking the MTC UE realizing access through the EPS system (that is, the MTC UE accesses the E-UTRAN network) for example.

Figure 4:
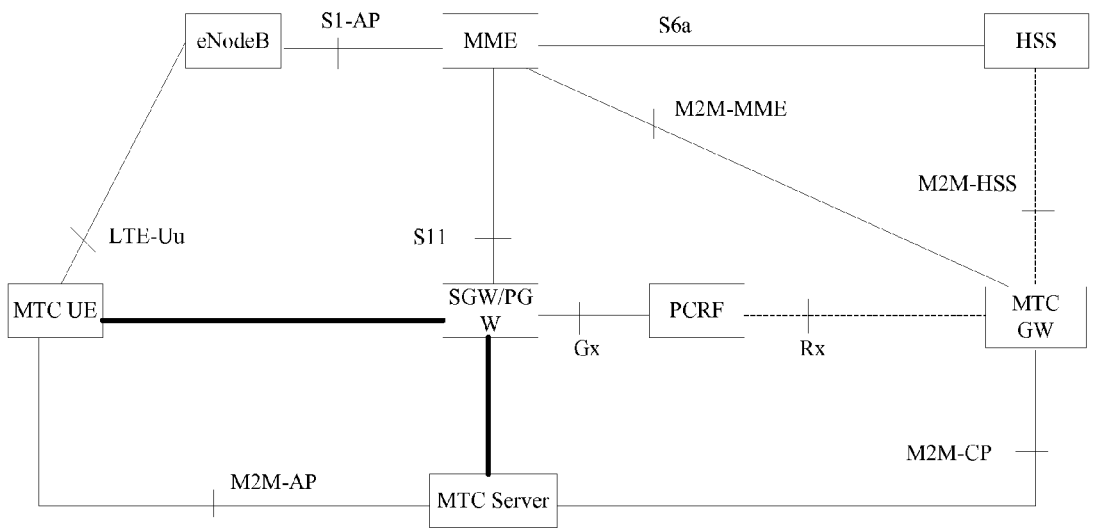
FIG. 4 shows an architecture diagram of the MTC UE accessing through an EPS system to realize the M2M communication in accordance with Embodiment 1 of the present invention.

FIG. 4 shows an architecture diagram of the MTC UE accessing through an EPS system to realize the M2M communication in the embodiment. As shown in FIG. 4, in the embodiment, connection is realized between the MTC GW and the MME, and between the MTC GW and the MTC Server, so that the MTC Server acquires the information of the underlying access layer/bearer of the MTC UE so as to judge the behavior of the MTC UE.

As shown in FIG. 4, in the architecture diagram, the MTC GW is deployed inside the core network, and the MTC Server might be deployed outside the core network of the operator or inside the core network. One MTC GW can serve a plurality of MTC Servers.

In the architecture diagram, an interface is established between the MTC GW and the MME, for convenience of description, this interface is called M2M-MME in the embodiment. Through the interface, the MTC GW can inquire from the MME about the information of a certain MTC UE, for example, the subscription data of the MTC UE, the current location area of the MTC UE, the current state of the MTC UE, etc. Or, through the interface, the MTC GW can subscribe to the event of the access layer/bearer related to a certain MTC UE from the MME, for example, events such as attachment of the MTC UE to the PS network, de-attachment of the MTC UE from the PS network, location movement of the MTC UE in the PS network, etc. Or, through the interface, the MME can actively notify the event of the underlying access layer related to a certain MTC UE to the MTC GW.

In the architecture diagram, as a communication medium (similar to proxy) between the MTC Server and the MME, the MTC GW accepts the inquiry about the information of the MTC UE and the subscription of the access layer event related to the MTC UE executed by the MTC Server, and the MTC GW forwards the requests to the MME. Before forwarding the requests, the MTC GW needs to perform security detection to the MTC Server, in the condition that the detection is passed, the MTC GW forwards the requests. During the procedure of forwarding the requests, the MTC GW probably needs to execute necessary protocol conversion process. Meanwhile, the MTC GW forwards the information of the MTC UE sent by the MME to the MTC Server.

Optionally, in the architecture, the MTC GW also can establish an interface with the HSS, for convenience of description, this interface is called M2M-HSS in the embodiment. Through the interface, the MTC GW can inquire from the HSS about the subscription data of the MTC UE; or, through the interface, the MTC GW can inquire from the HSS about the address of the MME allocated to the MTC UE.

Or, optionally, if the M2M-HSS interface is not established between the MTC GW and the HSS, the MTC GW can acquire the subscription data of the MTC UE through the M2M-MME interface between the MTC GW and the MME. The MTC GW can actively inquire about the subscription data of the MTC UE from the MME, and the MME also can actively send the subscription data of the MTC UE to the MTC GW.

Embodiment 2

The embodiment is illustrated by taking the MTC UE accessing the GERAN/UTRAN network for example.

FIG. 5 shows an architecture diagram of the MTC UE accessing through a GERAN/UTRAN network to realize the M2M communication in the embodiment. As shown in FIG. 5, the embodiment is basically similar to the Embodiment 1 above, and the difference is that: the SGSN in the GERAN/UTRAN network is equivalent to the MME in the E-UTRAN network and takes charge of the functions of access control of the PS domain and mobility management; the Gateway GPRS Support Node (GGSN) in the GERAN/UTRAN network is equivalent to the SGW and PGW in the E-UTRAN network; and the HLR in the GERAN/UTRAN network is equivalent to the HSS in the E-UTRAN network. The specific connection and the function of each network element are similar to the system embodiment 1 above, and no further description is needed here.

According to an embodiment of the present invention, a method for acquiring the information of the MTC UE is provided, wherein the method can be implemented through the system above provided by the embodiments of the present invention.

FIG. 6 shows a flowchart of a method for acquiring the information of an MTC UE according to an embodiment of the present invention. As shown in FIG. 6, the method for acquiring the information of an MTC UE according to an embodiment of the present invention mainly comprises the following steps (S601 to S603):

S601: an MTC GW acquires the information of an MTC UE which currently requests to attach to a network or has attached to a network through a mobility management network element; and S603: the MTC GW sends the information of the MTC UE acquired from the mobility management network element to the MTC Server.

In implementation, the step of the MTC Server acquiring the information of the MTC UE comprises but not limited to the following three implementing methods.

(A) The mobility management network element reports actively.

For example, the mobility management network element can actively send an event report to the MTC GW when an access layer event of a certain MTC UE occurs, or the mobility management network element can actively report the information of the MTC UE to the MTC GW after receiving an Attach Request sent by the MTC UE. After receiving the event report or the reported information of the MTC UE, the MTC GW sends the event report or the reported information of the MTC UE to the MTC Server.

(B) The MTC Server inquires from the mobility management network element through the MTC GW.

For example, the MTC Server can send an inquiry request to the MTC GW to inquire about the information of a certain MTC UE; after receiving the inquiry request, the MTC GW inquires about the information of the MTC UE from the mobility management network element, and the mobility management network element provides the information of the MTC UE to the MTC GW; then, the MTC GW sends the received information of the MTC UE to the MTC Server.

(C) The MTC Server subscribes to the event report related to the MTC UE.

For example, the MTC Server can subscribe to an access layer event related to a certain MTC UE from the MTC GW and the MTC GW subscribes to the access layer event related to the MTC UE from the mobility management network element; when the access layer event occurs, the mobility management network element actively notifies the MTC GW; after receiving the event report sent by the mobility management network, the MTC GW sends the event report to the MTC Server.

In addition, in specific application, the MTC Server also can initiate a registration notification to the MTC GW after receiving a service registration request which is initiated by the MTC UE after attaching to a network; after receiving the registration notification, the MTC GW acquires the address of the mobility management network element allocated to the MTC UE and acquires the related information of the MTC UE from the mobility management network element, then sends the related information to MTC Server. Or, the mobility management network element acquires, when the MTC UE attaches to a network, the address of the MTC Server serving the MTC UE and then forwards the related information of the MTC UE to the MTC Server through the MTC GW.

In the method above, since the mobility management network element and the MTC Server only need to interact with the MTC GW, no interaction is required between the mobility management network element and the MTC Server, therefore, the mobility management network element does not need to know the address of the MTC Server, likewise, the MTC Server does not need to know the address of the mobility management network element. However, regarding the MTC GW, after receiving the request of the MTC Server for inquiring about or subscribing to the information of a certain MTC UE, the MTC GW needs to forward the inquiry or subscription request to the mobility management network element, therefore, the MTC GW needs to know the address of the mobility management network element allocated to the MTC UE. Likewise, after acquiring the information of the MTC UE reported by the mobility management network element, the MTC GW needs to send the information of the MTC UE to the MTC Server serving the MTC UE, therefore, the MTC GW needs to know the address of the MTC Server serving the MTC UE. Thus, in the embodiment of the present invention, the MTC GW needs to maintain the relationship among the MTC UE, the MTC Server and the mobility management network element, that is, the MTC GW needs to acquire and store in advance the corresponding relationship among the identifier of the MTC UE, the address of the mobility management network element allocated to the MTC UE and the address of the MTC Server serving the MTC UE.

The above three methods for acquiring the information of the MTC UE are described below respectively. It should be noted that the three methods above can be used separately, or can be used with a combination of two or three.

(A) The Mobility Management Network Element Reports Actively.

For example, when the mobility management network element actively reports the information of the MTC UE, the mobility management network element actively reports the information of the MTC UE to the MTC Server through the MTC GW according to the indication carried in subscription data of the MTC UE acquired from the user subscription data repository. Specifically, the subscription data of the MTC UE acquired by the mobility management network element from the user subscription data repository includes but not limited to: indication information for indicating the mobility management network element to report the information of the MTC UE to the MTC Server (specifically, refer to the information including the reporting occasion and the reported parameters), the information of the MTC Server serving the MTC UE.

In implementation, the mobility management network element can actively report the information of the MTC UE to the MTC Server through the MTC GW when the MTC UE initiates an Attach Request, also can actively report an event report to the MTC Server through the MTC GW when an access layer event related to the MTC UE occurs after the MTC UE has attached to a network, and carry the current information of the MTC UE in the event report.

By taking the mobility management network element being an MME for example, the flows of the MME reporting to the MTC Server at the two reporting occasions above are illustrated below.

(1) When the MTC UE initiates an Attach Request, the MME actively reports the information of the MTC UE to the MTC Server through the MTC GW.

FIG. 7 shows a flowchart of the MME actively reporting the information of the MTC UE to the MTC Server through the MTC GW in the condition above. As shown in FIG. 7, when the MTC UE initiates an Attach Request, the step of the MME actively reporting the information of the MTC UE to the MTC Server through the MTC GW mainly comprises the steps as follows.

S701: the MTC UE initiates an Attach Request to the MME.

S702: the MME sends a Location Update Request to the HSS.

S703: the HSS returns a Location Update Response to the MME, wherein the Location Update Response carries subscription data of the MTC UE, the subscription data including: indication information for indicating the MME to report the information of the MTC UE to the MTC Server, information of the MTC Server serving the MTC UE (specifically, the information can be an IP address of the MTC Server, also can be a service identifier of the MTC Server, etc.)

S704: the MME parses out the address of the MTC Server according to the information of the MTC Server serving the MTC UE.

S705: the MME reports the information of the MTC UE to the MTC GW, besides, the information reported by the MME to the MTC GW further includes the address of the MTC Server parsed out in S704.

S706: the MTC GW sends the information of the MTC UE to the MTC Server corresponding to the address above.

(2) After the MTC UE attaches to the network, the MME actively reports the information of the MTC UE to the MTC Server through the MTC GW.

Figure 8:
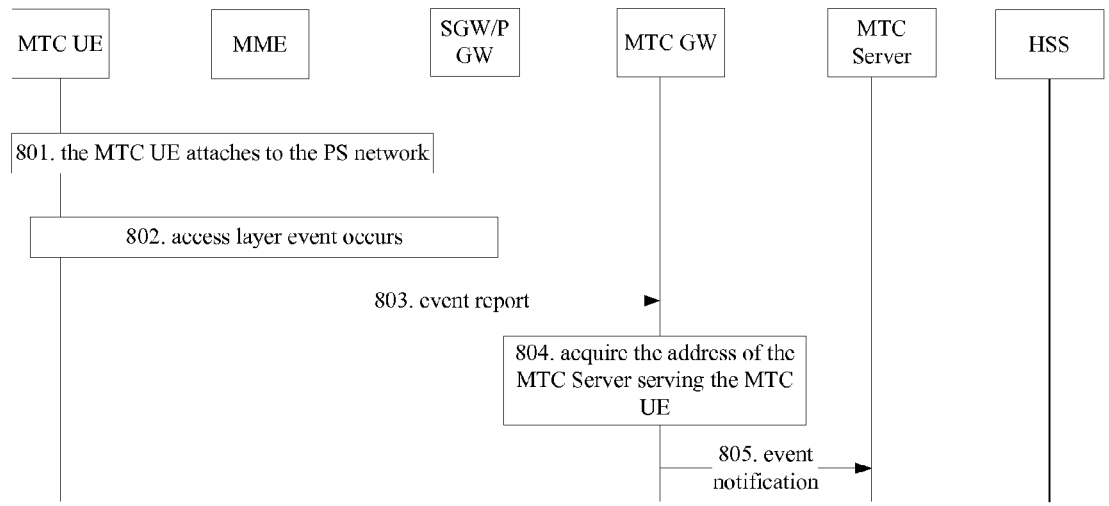
FIG. 8 shows another flowchart of an MME actively reporting the information of the MTC UE to the MTC Server in accordance with an embodiment of the present invention.

FIG. 8 shows a flowchart of the MME actively reporting the information of the MTC UE to the MTC Server through the MTC GW in the condition above. As shown in FIG. 8, after the MTC UE attaches to a network, the step of the MME actively reporting the information of the MTC UE to the MTC Server through the MTC GW mainly comprises the steps as follows.

S801: the MTC UE attaches to the PS network.

During the process of the MTC UE attaching to the PS network, the MME acquires subscription data of the MTC UE from the HSS, wherein the subscription data include the subscription data used for the M2M service part. The subscription data of the M2M service include: the address of the MTC Server (or the identifier information of the MTC Server) serving the MTC UE, an indication for requesting the MME to actively report a predetermined event related to the MTC UE to the MTC Server, that is, requesting the MME to send an event report to the MTC Server when the predetermined event occurs at the MTC UE.

In the above, the predetermined event is the access layer event related to the MTC UE; specifically, the predetermined event includes but not limited to one of the following or combination thereof:

(1) change of subscription data of the MTC UE: when the HSS changes the subscription data of the MTC UE, the HSS needs to retransmit new subscription data to the MME; after receiving the new subscription data, the MME can inform the MTC Server that the subscription data change or directly send the new subscription data to the MTC Server;

(2) change of a state of the MTC UE, for example, the MTC UE attaches to the network, the MTC UE de-attaches from the network, the MTC UE changes from connection state to idle state, the MTC UE changes from idle state to connection state;

(3) change of a location area of the MTC UE, for example, the location of the MTC UE is moved; when the location of the MTC UE is moved, the MTC UE sends a location update message to the MME so that the MME can acquire that the location of the MTC UE is moved;

(4) change of a network of the MTC UE, for example, base station or network handover occurs on the MTC UE; in this condition, the MTC UE sends a handover message to the MME so that the MME can acquire the network change event occurring on the MTC UE;

(5) change of a relationship between the IMSI and the IMEI used by the MTC UE, for example, pairing relationship between the IMSI and the IMEI that the MTC UE should apply is regulated in the subscription data, but the current MTC UE changes the terminal (for example, the SIM card is changed to a non-MTC UE), in this condition, the MTC Server needs to acquire the IMSI-IMEI paring used by the MTC UE.

S802: the predetermined event above, that is, the access layer event related to the MTC UE, occurs.

S803: the MME actively informs the MTC GW of the occurrence of the predetermined event, wherein the event report sent by the MME to the MTC GW includes the current information of the MTC UE.

S804: the MTC GW acquires the address of the MTC Server serving the MTC UE according to the corresponding relationship among the identifier of the MTC UE, the address of the mobility management network element allocated to the MTC UE and the address of the MTC Server serving the MTC UE acquired in advance.

S805: the MTC GW sends the event report above to the MTC Server.

It should be noted that in the flow shown in FIG. 8 the access layer event of S802 probably occurs in S801, for example, the event is an attachment event, then the MME should send an event report to the MTC Server when the MTC UE attaches to the network.

Specifically, in the flows shown in FIG. 7 and FIG. 8, the information of the MTC UE reported by the MME to the MTC Server includes but not limited to one of the following or any combination thereof:

A) the current service subscription data of the MTC UE acquired by the MME from the HSS;

B) the IMSI and the IMEI used by the MTC UE, wherein the IMSI used by the MTC UE is carried in the attachment message sent when the MTC UE attaches to the network; while the IMEI probably is provided to the network when the MTC UE attaches to the network, or can be acquired by the network by inquiring from the MTC UE according to the requirement;

C) the context information of the MTC UE on the MME, for example, the current location area of the MTC UE, and/or, the current state of the MTC UE;

wherein the current location area of the MTC UE may be: Track Area (TA) of the MTC UE, current Cell of the MTC UE; and the current state of the MTC UE may be one of attachment state, de-attachment state, connection state, idle state, etc.

D) mobility event currently occurring on the MTC UE, for example, the MTC UE attaches to a network, the MTC UE de-attaches from the network, the location of the MTC UE is updated, base station handover occurs to the MTC UE, network handover occurs to the MTC UE, etc.

(B) The MTC Server Inquires From the Mobility Management Network Element Through the MTC GW.

Specifically, after the MTC UE attaches to a network, the MTC Server sends an inquiry request to the mobility management network element through the MTC GW to inquire about the information of the MTC UE; after receiving the inquiry request, the mobility management network element reports the information of the MTC UE to the MTC GW and then the MTC GW sends the information of the MTC UE to the MTC Server.

In implementation, after receiving the inquiry request sent by the MTC Server, the MTC GW needs to perform security verification for the MTC Server first; specifically, the MTC GW can judge whether the MTC Server is in the scope of the MTC Servers allowed to have access according to the acquired information (for example, service identifier, IP address, etc.) of the MTC Servers allowed to have access by the core network, if yes, the MTC GW continues to perform the inquiry request, acquires the address of the mobility management network element allocated to the MTC UE according to the corresponding relationship among the identifier of the MTC UE, the address of the mobility management network element allocated to the MTC UE and the address of the MTC Server serving the MTC UE acquired in advance, and forwards the inquiry request to the mobility management network element; otherwise, the MTC GW refuses the inquiry request.

Figure 9:
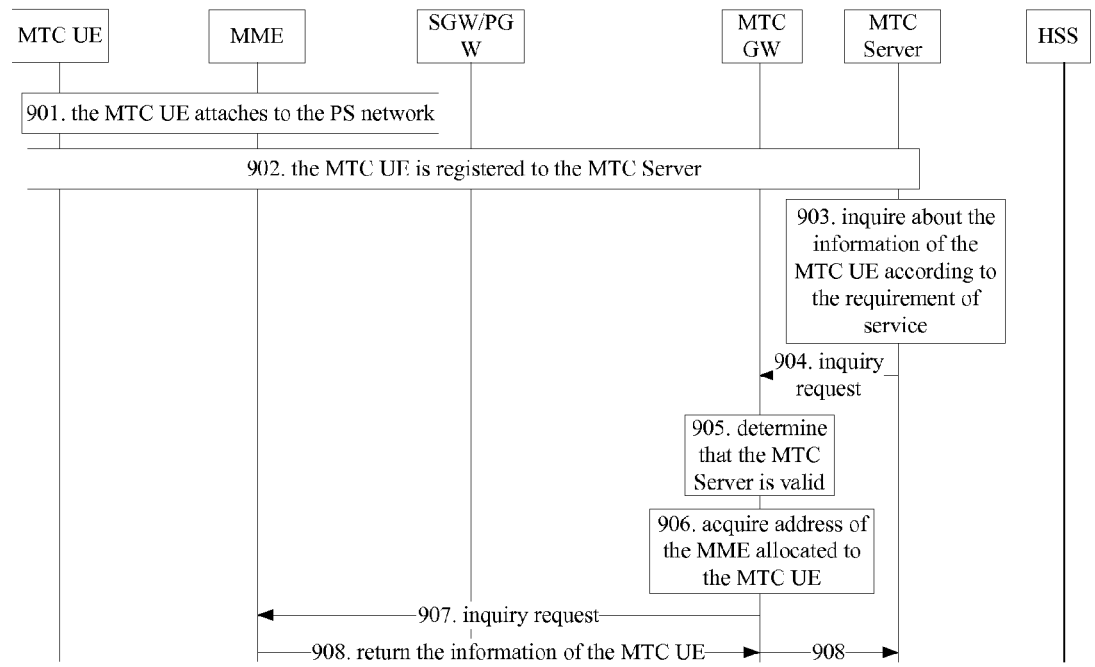
FIG. 9 shows a flowchart of the MTC Server sending an inquiry request to the MME through the MTC GW to acquire the information of the MTC UE in accordance with an embodiment of the present invention.

Specifically, taking the E-UTRAN network as an example, FIG. 9 shows a flowchart of the MTC Server sending an inquiry request to the MME through the MTC GW to acquire the access layer information of the MTC UE. As shown in FIG. 9, the step of the MTC Server sending an inquiry request to the MME through the MTC GW to acquire the information of the MTC UE mainly comprises the steps as follows.

S901: the MTC UE attaches to the PS network.

S902: the MTC UE initiates service layer registration to the MTC Server.

S903: after the MTC UE is registered to the MTC Server, for the purpose of service control, the MTC Server decides that it is required to inquire about the current information of the MTC UE (mainly refer to the access layer information).

In S903, the MTC Server acquires the information of the MTC UE probably for multiple purposes, for example:

the MTC Server hopes to know the IMSI and the IMEI used by the MTC UE so as to check whether the SIM card provided for the MTC UE is misappropriated, that is, whether the binding relationship between the IMSI and the IMEI is normal; or, the MTC Server hopes to know the current location information (for example, TA area, Cell, etc.) of the MTC UE so as to judge whether the MTC UE accesses from a forbidden location area, or whether the MTC UE moves to a forbidden location area.

S904: the MTC Server sends an inquiry request to the MTC GW so as to inquire about the information of the MTC UE, wherein the inquiry request carries information such as the identifier of the MTC UE and the address of the MTC Server.

S905: the MTC GW receives the inquiry request, and performs valid authentication for the MTC Server to confirm that the MTC Server is valid.

S906: the MTC GW acquires the address of the MME allocated to the MTC UE according to the corresponding relationship among the identifier of the MTC UE, the address of the MME allocated to the MTC UE and the address of the MTC Server serving the MTC UE acquired in advance.

S907: the MTC GW forwards the inquiry request to the MME.

S908: the MME returns the current information of the MTC UE to the MTC GW according to the current context of the MTC UE, and the MTC GW sends the current information of the MTC UE to the MTC Server.

Through S903 to S908, the MTC Server acquires the current information of the MTC UE from the MME through the MTC GW, thereby judging the current behavior of the MTC UE according to the current information of the MTC UE and further controlling the behavior of the MTC UE.

Specifically, in the steps above, the information of the MTC UE requested by the MTC Server from the MME includes but not limited to one of the following or any combination thereof:

A) the current service subscription data of the MTC UE acquired by the MME from the HSS;

B) the IMSI and the IMEI used by the MTC UE; specifically, the IMSI used by the MTC UE must be carried in the attachment message when the MTC UE attaches to the network, and the MME can acquire the IMSI used by the MTC UE from the attachment message, while the IMEI may be provided to the network when the MTC UE attaches to the network, also can be acquired by the network by inquiring from the MTC UE according to the requirement;

C) the context information of the MTC UE on the MME, for example, the current location area of the MTC UE (the location area can be TA area, Cell), and/or, the current state of the MTC UE (for example, the current MTC UE is in attachment state, connection state, idle state, etc.).

(C) The MTC Server Subscribes to the Event Report Related to the MTC UE From the Mobility Management Network Element Through the MTC GW.

Due to the requirement of service management, the MTC Server needs to know the event (for example, attachment of the MTC UE to network, de-attachment of the MTC UE from network, location change of the MTC UE, etc.) sent by the underlying access layer in time and make corresponding decision according to the event so as to control the behavior of the MTC UE. Therefore, the MTC Server can subscribe to the access layer event from the mobility management network element through the MTC GW, and the mobility management network element reports, when the corresponding access layer event occurs, the event report to the MTC Server through the MTC GW in time, wherein the event report carries the current information of the MTC UE.

In this condition, the process of the MTC Server is basically similar to that of (B). After the MTC Server sends to the MTC GW an inquiry request of subscribing to the related event of the MTC UE, the MTC GW also needs to perform security verification for the MTC Server, and forwards the inquiry request to the mobility management network element allocated to the MTC UE after the verification is passed, the specific method is the same as the above and no further description is needed here. In addition, before forwarding, the MTC GW also needs to acquire the address of the mobility management network element allocated to the MTC UE.

The difference from (B) is that the inquiry request sent by the MTC Server to the mobility management network element through the MTC GW is used to subscribe to the related event of the MTC UE, that is, request the mobility management network element to report an event report to the MTC Server through the MTC GW when the access layer event related to the MTC UE occurs.

Figure 10:
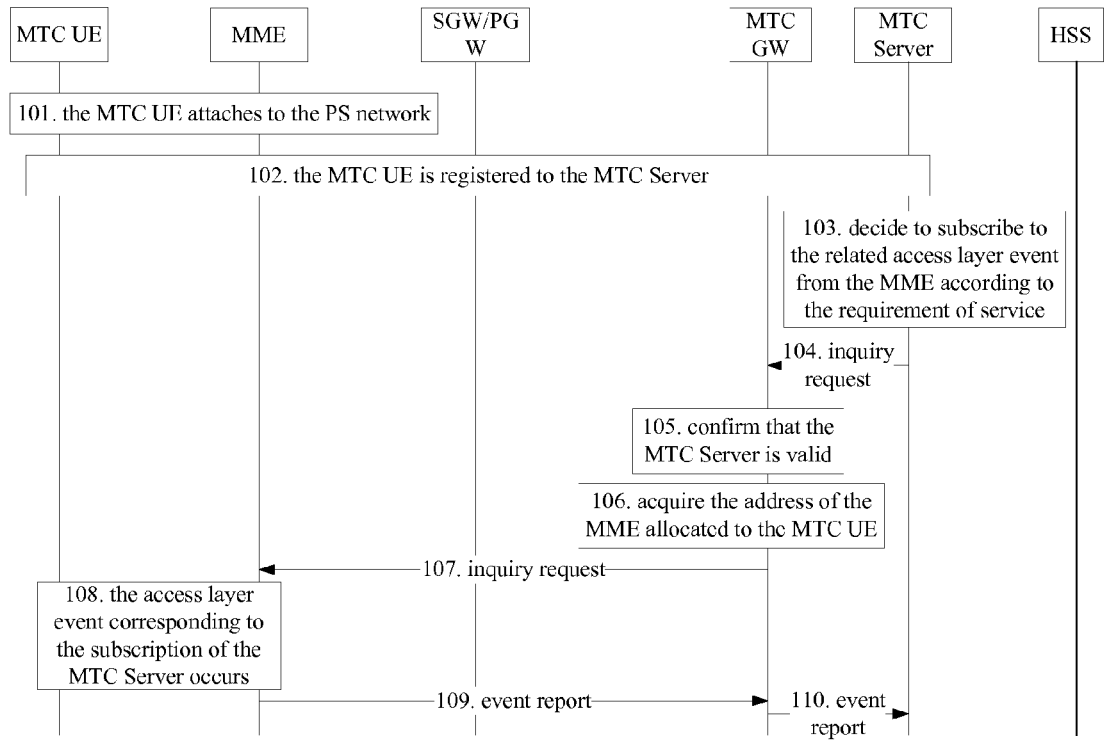
FIG. 10 shows a flowchart of the MTC Server subscribing to the related event of the MTC UE from the MME so as to acquire the information of the MTC UE in accordance with an embodiment of the present invention.

FIG. 10 shows a flowchart of the MTC Server subscribing to the related event of the MTC UE from the MME so as to acquire the information of the MTC UE by taking the E-UTRAN network for example. As shown in FIG. 10, the step of the MTC Server subscribing to the related event of the MTC UE from the MME so as to acquire the information of the MTC UE mainly comprises the steps as follows.

S101: the MTC UE attaches to the PS network.

S102: the MTC UE initiates service layer registration to the MTC Server.

S103: after the MTC UE is registered to the MTC Server, according to the need of service management, the MTC Server needs to acquire the event related to the MTC UE occurring in the underlying access layer in time, therefore, the MTC Server decides to subscribe to the events from the MME.

S104: the MTC Server sends to the MTC GW an inquiry request for subscribing to the access layer event related to the MTC UE.

It should be clear that the MTC Server can subscribe to one or one type of access layer event once, also can subscribe to more or more types of access layer events once.

S105: the MTC GW receives the inquiry request, and performs security verification for the MTC Server to confirm that the MTC Server is valid.

S106: the MTC GW acquires the address of the MME allocated to the MTC UE according to the corresponding relationship among the identifier of the MTC UE, the address of the MME allocated to the MTC UE and the address of the MTC Server serving the MTC UE acquired in advance.

S107: the MTC GW forwards the inquiry request to the MME to subscribe to the access layer event related to the MTC UE from the MME.

S108: the access layer event corresponding to the subscription of the MTC Server occurs.

S109: the MME actively reports an event report of the access layer event to the MTC GW after the access layer event occurs, wherein the event report carries the current related information of the MTC UE.

S110: the MTC GW sends the received event report to the MTC Server.

In the flow shown in FIG. 10, the access layer event related to the MTC UE subscribed by the MTC Server can be one or more of the following:

A) change of subscription data of the MTC UE: when the HSS changes the subscription data of the MTC UE, the HSS needs to retransmit new subscription data to the MME; after receiving the new subscription data, the MME can inform the MTC Server that the subscription data change or directly send the new subscription data to the MTC Server;

B) change of a state of the MTC UE, for example, the MTC UE attaches to the network, the MTC UE de-attaches from the network, the MTC UE changes from connection state to idle state, the MTC UE changes from idle state to connection state, etc.;

C) change of a location area of the MTC UE, for example, the location of MTC UE is moved, a location update message is sent to the MME, etc.;

D) change of a network of the MTC UE, for example, base station or network handover occurs to the MTC UE, a handover message is sent to the MME.

In implementation, the methods of acquiring the information of the MTC UE described in the (B) and (C) can be used separately or combined. For example, in the flow shown in FIG. 9, the information of the MTC UE requested to be inquired by the MTC Server in S903 can further include:

D) mobility event occurring on the MTC UE, for example, the MTC UE attaches to a network, the MTC UE de-attaches from the network, the location of the MTC UE is updated, base station handover occurs to the MTC UE, network handover occurs to the MTC UE, etc.

When the above event occurs, the MME sends an event report to the MTC Server through the MTC GW, so that the MTC Server is able to know the event currently occurring on the MTC UE and the current information of the MTC UE.

The MTC Server also can further execute S103 and the subsequent steps in FIG. 10 after executing S908 in FIG. 9 and acquiring the current information of the MTC UE, or can execute S903 and S103 simultaneously after the S902 is executed so as to subscribe to the related event of the MTC UE, thus the MTC Server acquires the occurrence of the events through the event report reported by the MME when the events occur and further acquires the current information of the MTC UE.

Through the flows shown in FIG. 7 to FIG. 10, the MTC Server can acquire the information of the MTC UE from the MME through the MTC GW, the information specifically including the subscription data of the MTC UE, the current state of the MTC UE, the location area information of the MTC UE, etc. The way of acquiring the information of the MTC UE can be as follows: the MTC Server inquires from the MME actively through the MTC GW; or, after the MTC Server subscribes to the related event from the MME through the MTC GW, the MME notifies the MTC Server at the occurrence of the event; or, the MME actively notifies the access layer event to the MTC Server through the MTC GW according to the indication in the subscription data of the MTC UE.

When the MTC Server acquires the information of the MTC UE from the underlying access layer, the MTC Server can further judge the behavior of the MTC UE according to the information and make decision according to the service to control the behavior of the MTC UE (for example, when the MTC UE accesses at a forbidden time, the MTC Server can require the de-attachment of the MTC UE; when the MTC UE moves to a forbidden area, the MTC Server can require the de-attachment of the MTC UE, and the like).

In the method above, in order to realize the data interaction between the MTC Server and the mobility management network element, the MTC GW needs to acquire and store the corresponding relationship among the identifier of the MTC UE, the address of the mobility management network element allocated to the MTC UE and the address of the MTC Server serving the MTC UE. In implementation, the step of the MTC Server acquiring the corresponding relationship comprises but not limited to the following three methods.

Method 1: the MTC Server sends, to the MTC GW, a registration notification message carrying the identifier information of the mobility management network element allocated to the MTC UE.

Specifically, after the MTC UE attaches to the network, when sending a registration request to the MTC Server, the MTC UE carries the identifier information of the mobility management network element allocated to the MTC UE in the registration request, after receiving the registration request, the MTC Server sends to the MTC GW a registration notification message which carries the identifier information of the mobility management network element allocated to the MTC UE, through the registration notification message, the MTC GW can acquire the corresponding relationship.

For example, in the EPS network, the registration message sent by the MTC UE to the MTC Server can carry a Global Unique Temporary Identity (GUTI) allocated to the MTC UE by the network, wherein the GUTI includes the ID information of the MME allocated to the MTC UE; the MTC Server carries the GUTI into the registration notification message and sends the registration notification message to the MTC GW; then the MTC GW acquires the address of the MME allocated to the MTC UE by parsing the GUTI, thereby acquiring the corresponding relationship.

Method 2: the mobility management network element allocated to the MTC UE and the MTC Server serving the MTC UE actively inform the MTC GW of their respective addresses.

Method 3: the MTC GW acquires the address of the mobility management network element allocated to the MTC UE from the user subscription data repository through the interface between the MTC GW and the user subscription data repository, and acquires the related information of the MTC Server actively informed by the MTC Server serving the MTC UE.

The three methods for acquiring the address of the mobility management network element are described below by taking the E-UTRAN network as an example.

Method 1

Figure 11:
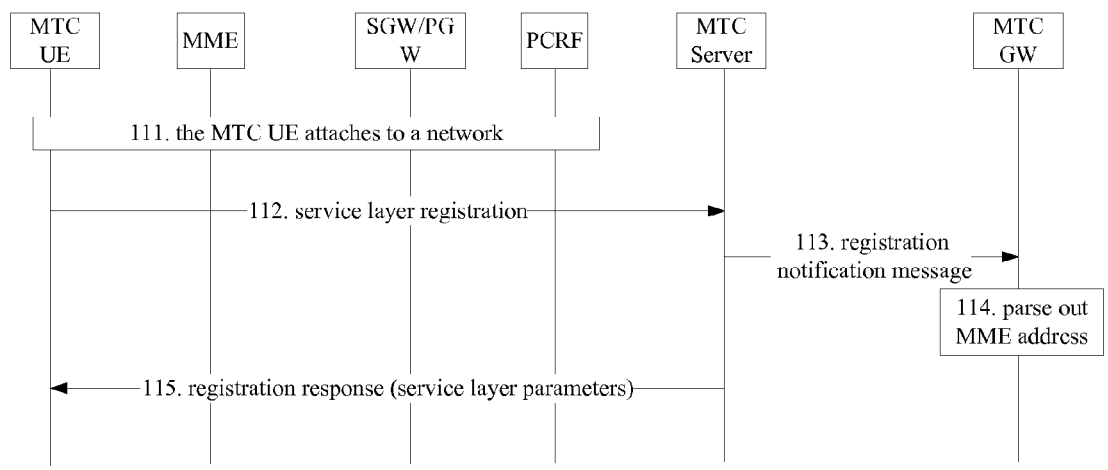
FIG. 11 shows a flowchart of the MTC GW acquiring the corresponding relationship among the identifier of the MTC UE, the address of the MTC Server serving the MTC UE and the address of the MME allocated to the MTC UE by adopting Method 1 in accordance with an embodiment of the present invention.

FIG. 11 shows a flowchart of the MTC GW acquiring the corresponding relationship among the identifier of the MTC UE, the address of the MTC Server serving the MTC UE and the address of the MME allocated to the MTC UE by adopting Method 1. As shown in FIG. 11, the step of the MTC GW acquiring the corresponding relationship mainly comprises the steps as follows.

S111: the MTC UE attaches to the PS network; during the attachment procedure, the MTC UE is allocated with a GUTI which is contained in an Attach Response to be sent to the MTC UE.

According to the composition of the GUTI in prior art, the GUTI includes the ID information of the MME allocated to the MTC UE, and according to the MME ID, the MME allocated to the MTC UE can be addressed.

S112: after attaching to the PS network, the MTC UE initiates application layer registration to the MTC Server, wherein the registration message carries the GUTI information.

S113: after receiving the registration request of the MTC UE, the MTC Server sends a registration notification message to the MTC GW.

The registration notification message carries: the information of the MTC UE, the information of the MTC Server and the GUTI information, wherein the information of the MTC UE includes: the IMSI of the MTC UE and/or the IP address of the MTC UE; the information of the MTC Server includes: the service identifier of the MTC Server and/or the IP address of the MTC Server.

S114: according to the GUTI information carried in the registration notification message, the MTC GW parses to obtain the address of the MME allocated to the MTC UE.

Meanwhile, the MTC GW stores locally the corresponding relationship among the identifier of the MTC UE, the address of the MTC Server serving the MTC UE and the address of the MME allocated to the MTC UE so as to realize the association of the three.

S115: if the MTC Server judges that the MTC UE registration is allowed according to service data, the MTC Server returns a registration response. The registration response probably carries a certain number of service layer parameters to the MTC UE.

Method 2

Figure 12:
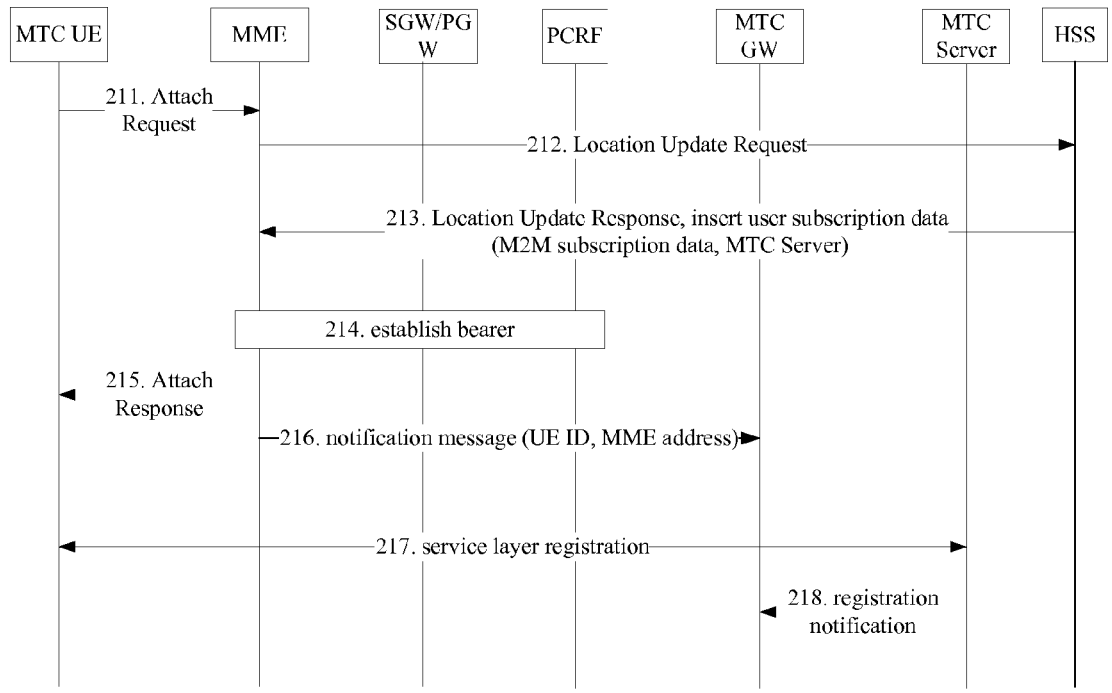
FIG. 12 shows a flowchart of the MTC GW acquiring the corresponding relationship above by adopting Method 2 in accordance with an embodiment of the present invention.

FIG. 12 shows a flowchart of the MTC GW acquiring the corresponding relationship among the MTC UE, the address of the MTC Server serving the MTC UE and the address of the MME allocated to the MTC UE by adopting Method 2. As shown in FIG. 12, the step of the MTC GW acquiring the corresponding relationship mainly comprises the steps as follows.

S211: the MTC UE sends an Attach Request to the network; specifically, the MTC UE sends an Attach Request to the MME.

S212: the MME sends a Location Update Request to the HSS.

S213: the HSS sends a Location Update Response to the MME.

During the procedure, the HSS issues the subscription data of the MTC UE to the MME, wherein the subscription data include M2M subscription data and the M2M subscription data include the information (probably a domain name, or an IP address) of the MTC Server serving the MTC UE. According to the information, the address of the MTC Server can be parsed out.

S214: the MME indicates the SGW/PGW to establish a proper bearer for the MTC UE.

S215: the MME sends an Attach Response to the MTC UE.

S216: the MME sends a notification message to the MTC GW to inform the MTC GW of the address of the MME allocated to the MTC UE.

In addition, optionally, the MME also can include the address of the MTC Server serving the MTC UE in the notification message, so that the MTC GW can acquire the corresponding relationship among the MTC UE, the address of the MTC Server serving the MTC UE and the address of the MME allocated to the MTC UE through the notification message.

Specifically, the notification message can be an independent notification message, also can be contained in other messages sent by the MME to the MTC GW (for example, when the MTC UE attaches to the network, the MME sends an attachment event report to the MTC GW), wherein the notification message contains the following information: the identifier information of the MTC UE (specifically including: the identifier of the MTC UE (for example, IMSI) and/or the IP address of the MTC UE), and the identifier information of the MME (specifically including: the identifier of the MME and/or the IP address of the MME). According to the corresponding relationship between identifier information of the MTC UE and of the MME, the MTC GW can acquire the address information of the MME allocated to the MTC UE.

S217: the MTC UE initiates service layer registration to the MTC Server.

S218: the MTC Server sends a registration notification message to the MTC GW.

Specifically, the parameters carried in the notification message by the MTC Server include: the identifier information of the MTC UE and the identifier information of the MTC Server, specifically, the identifier information of the MTC UE may include: the identifier of the MTC UE (for example, IMSI) and/or the IP address of the MTC UE; and the identifier information of the MTC Server may include: the service identifier and/or the IP address of the MTC Server.

After receiving the registration notification message, the MTC GW can acquire the address of the MTC Server serving the MTC UE and the address of the MME allocated to the MTC UE, thereby establishing the corresponding relationship among the identifier of the MTC UE, the address of the MTC Server serving the MTC UE and the MME allocated to the MTC UE.

In the flow shown in FIG. 12, it should be noted that S216 can be initiated after S215 or after S213; no matter when the step is initiated, the effect thereof is the same; no limitation is provided in the present invention.

Method 3

Figure 13:
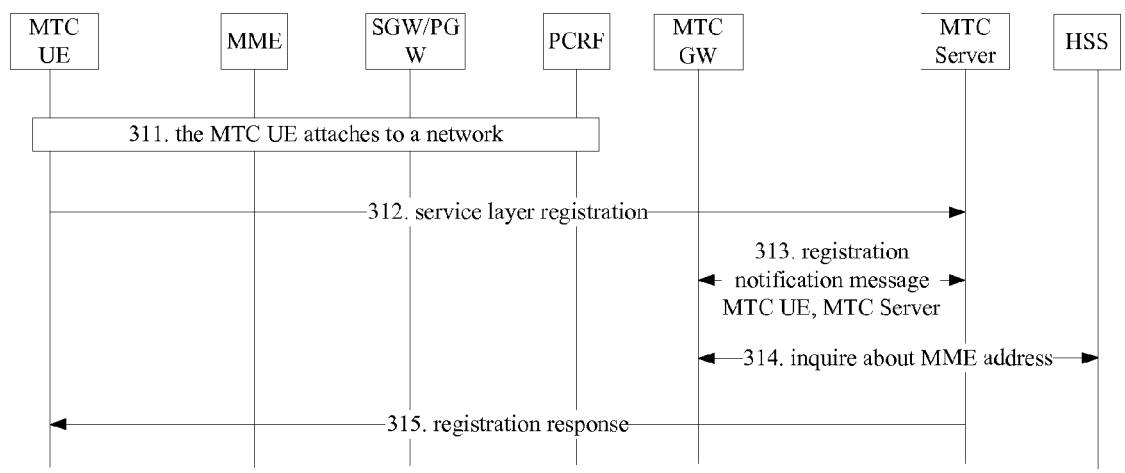
FIG. 13 shows a flowchart of the MTC GW acquiring the corresponding relationship above by adopting Method 3 in accordance with an embodiment of the present invention.

FIG. 13 shows a flowchart of the MTC GW acquiring the corresponding relationship among the MTC UE, the address of the MTC Server serving the MTC UE and the address of the MME allocated to the MTC UE by adopting Method 3. As shown in FIG. 13, the step of the MTC GW acquiring the corresponding relationship mainly comprises the steps as follows.

S311: the MTC UE attaches to the PS network.

During the attachment procedure of the MTC UE to the network, the HSS stores the address of the MME allocated to the MTC UE.

S312: the MTC UE initiates service layer registration to the MTC Server.

S313: the MTC Server sends a registration notification message to the MTC GW.

The registration notification message carries the identifier information of the MTC UE and the identifier information of the MTC Server, wherein the identifier information of the MTC UE includes: the identifier (for example, IMSI) and/or the IP address of the MTC UE; and the identifier information of the MTC Server includes: the service identifier and/or the IP address of the MTC Server.

S314: the MTC GW inquires from the HSS about the address of the MME allocated to the MTC UE and the HSS returns the address of the MME allocated to the MTC UE.

Therefore, from S313 and S314, the MTC GW acquires the corresponding relationship among the identifier of the MTC UE, the address of the MTC Server serving the MTC UE and the address of the MME allocated to the MTC UE.

S315: the MTC Server sends a registration response to the MTC UE.

In the flow shown in FIG. 13, it should be noted that the step of the MTC GW inquiring from the HSS about the address of the MME allocated to the MTC UE can be that: the MTC GW inquires from the HSS about the subscription data of the MTC UE, and the HSS returns the address of the MME allocated to the MTC UE while returning the subscription data of the MTC UE; also can be that: the MTC GW inquires from the HSS about the address of the MME allocated to the MTC UE, and the HSS only returns the address of the MME allocated to the MTC UE.

Through the flows shown in FIG. 11 to FIG. 13, the MTC GW can acquire the address of the MME allocated to the MTC UE; in addition, the MTC GW also acquires the address of the MTC Server serving the MTC UE. Therefore, the MME can send the information of the MTC UE to the MTC Server and report the access layer information related to the MTC UE through the MTC GW, and the MTC Server can inquire from the MME about the information of the MTC UE and subscribe to the access layer event related to the MTC UE through the MTC GW.

Although the above embodiments are described by taking the E-UTRAN (EPS) network as an example, actually, for the GPRS access in the GERAN/UTRAN network, the SGSN in the GERAN/UTRAN network is equivalent to the MME in the E-UTRAN network, taking charge of the function of access control and mobility management of the PS domain; while the GGSN in the GERAN/UTRAN network is equivalent to the SGW+PGW in the E-UTRAN network, the HLR in the GERAN/UTRAN is equivalent to the HSS in the E-UTRAN network. Therefore, according to the description in the embodiments of the present invention, those skilled in the art can directly apply the technical solution provided by the embodiments of the present invention to the PS domain in the GERAN/UTRAN network.

It should be noted that the steps shown in the flowcharts of the accompanying drawings can be executed in a computer system in which a group of computers can execute instructions. Although the logical order is shown in the flowchart, the illustrated or described steps may be carried out in a different order in some cases.

As mentioned above, in the embodiments of the present invention, the MTC Server acquires the information of the MTC UE of the access layer/bearer layer from the mobility management network element through the MTC GW, thereby effectively controlling the MTC UE according to the acquired information of the MTC UE so as to realize the intelligent management and real-time monitoring of the MTC UE by the MTC Server. Meanwhile, security verification is performed for the MTC Server through the MTC GW, only the allowed MTC Server can access the core network, the illegal MTC Server is refused to access the core network, thus the security of the core network is guaranteed.

Obviously, those skilled in the art should understand that the modules and steps described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage device to be executed by a computing device, or manufactured into individual integrated circuit module respectively, or several of them can be manufactured into a single integrated circuit module; in this way, the present invention is not limited to any combination of specific hardware and software The above are only the preferable embodiments of the present invention and not intended to limit the present invention. For those skilled in the art, various modifications and changes can be made to the present invention. Any modification, equivalent substitute and improvement within the spirit and principle of the present invention are deemed to be included within the scope of the present invention.

What is claimed is:

1. A method for acquiring information of Machine Type Communication (MTC) user equipment (UE), wherein a mobility management network element is coupled with an MTC GateWay (MTC GW), the MTC GW is coupled with an MTC Server, and the method comprises the steps of:
   the MTC GW acquiring, through the mobility management network element, the information of the MTC UE which currently requests to attach to a network or has attached to a network; and
   the MTC GW sending the information of the MTC UE acquired from the mobility management network element to the MTC Server;
   wherein the step of the MTC GW acquiring the information of the MTC UE through the mobility management network element comprises the steps of:
   the mobility management network element reporting the information of the MTC UE to the MTC GW; and the MTC GW acquiring the information of the MTC UE reported by the mobility management network element;
   the step of the mobility management network element reporting the information of the MTC UE to the MTC GW comprises the step of: the mobility management network element reporting, after receiving a Location Update Response, the information of the MTC Server and the information of the MTC UE to the MTC GW according to indication of first indication information comprised in subscription data, wherein the first indication information indicates the mobility management network element to report the information of the MTC UE;
   the step of the MTC GW sending the acquired information of the MTC UE to the MTC Server comprises the step of: the MTC GW acquiring the address of the MTC Server according to the information of the MTC Server and sending the information of the MTC UE to the MTC Server.

2. The method according to claim 1, wherein the step of the mobility management network element reporting the information of the MTC UE to the MTC GW comprises the step of:
   the mobility management network element reporting, according to the indication of subscription data of the MTC UE acquired from a user subscription data repository, the information of the MTC UE to the MTC GW.

3. The method according to claim 2, wherein the subscription data comprise information of the MTC Server serving the MTC UE.

4. The method according to claim 2, wherein the subscription data further comprise: second indication information which indicates the mobility management network element to send an event report to the MTC Server when a predetermined event occurs at the MTC UE;
   the step of the mobility management network element reporting the information of the MTC UE to the MTC GW comprises the step of:
   the mobility management network element sending, when detecting that the predetermined event occurs at the MTC UE, an event report to the MTC GW according to indication of the second indication information, wherein the event report carries current information of the MTC UE.

5. The method according to claim 4, wherein the predetermined event comprises one or any combination of the following:

change of subscription data of the MTC UE;
change of a location of the MTC UE;
change of a state of the MTC UE;
change of a network of the MTC UE;
changes of International Mobile Subscriber Identification Number (IMSI) and International Mobile Equipment Identity (IMEI) used by MTC UE.

6. The method according to claim 1, wherein before the step of the mobility management network element reporting the information of the MTC UE to the MTC GW, the method further comprises the steps of:
the MTC GW sending, after the MTC UE attaches to a network, an inquiry request to the mobility management network element; and
the mobility management network element receiving the inquiry request.

7. The method according to claim 6, wherein the step of the MTC GW sending the inquiry request to the mobility management network element comprises the steps of:
the MTC Server sending, when determining that it is required to acquire the information of the MTC UE, an inquiry request to the MTC GW;
the MTC GW receiving the inquiry request and acquiring an address of the mobility management network element allocated to the MTC UE; and
the MTC GW sending the inquiry request to the mobility management network element.

8. The method according to claim 7, wherein the step of the MTC GW acquiring the address of the mobility management network element allocated to the MTC UE comprises the step of:
the MTC GW acquiring the address of the mobility management network element according to a corresponding relationship acquired in advance among an identifier of the MTC UE, the address of the mobility management network element allocated to the MTC UE and an address of the MTC Server serving the MTC UE.

9. The method according to claim 7, wherein the MTC Server determines that it is required to acquire the information of the MTC UE in one of the following conditions that:
the MTC Server requires to detect whether a Subscriber Identity Module (SIM) card provided for the MTC UE is misappropriated;
the MTC Server requires to judge whether the MTC UE accesses from a forbidden location area;
the MTC Server requires to judge whether the MTC UE moves to a forbidden location area;
the MTC Server requires to judge whether the MTC UE accesses at a forbidden time; and
the MTC Server requires to judge whether the time of the MTC UE accessing a network exceeds a predetermined time length.

10. The method according to claim 7, wherein after the step of the MTC GW receiving the inquiry request and before the step of the MTC GW acquiring the address of the mobility management network element, the method further comprises the step of:
the MTC GW judging, according to information of MTC Servers which are allowed to access by the core network acquired in advance, that the MTC Server is in a scope of the MTC Servers which are allowed to access.

11. The method according to claim 6, wherein the inquiry request is used to inquire about the information of the MTC UE;
the step of the mobility management network element reporting the information of the MTC UE to the MTC GW comprises the step of: the mobility management network element acquiring, after receiving the inquiry request, the current information of the MTC UE and reporting the acquired information of the MTC UE to the MTC GW.

12. The method according to claim 1, wherein the information of the MTC UE comprises one or any combination of the following:
current service subscription data of the MTC UE;
an IMSI and an IMEI used by the MTC UE; and
context information of the MTC UE on the mobility management network element.

13. The method according to claim 12, wherein the context information of the MTC UE on the mobility management network element comprises: current location area information of the MTC UE, and/or, current state information of the MTC UE.

14. The method according to claim 1, wherein the mobility management network element comprises: a Serving General Packet Radio Service Supporting Node (SGSN) or a Mobility Management Entity (MME).

15. A system for acquiring information of a Machine Type Communication (MTC) user equipment (UE), comprising: a user subscription data repository, an MTC GateWay (GW), a mobility management network element and an MTC Server, wherein the user subscription data repository is configured to store subscription data of the MTC UE in the system;
the mobility management network element is coupled with the user subscription data repository and is configured to receive the subscription data, transmitted by the user subscription data repository, of the MTC UE which currently requests to attach to a network or has attached to a network, and provide the information of the MTC UE to the MTC GW; wherein the mobility management network element is configured to report, after receiving a Location Update Response, the information of the MTC Server and the information of the MTC UE to the MTC GW according to indication of first indication information comprised in the subscription data, wherein the first indication information indicates the mobility management network element to report the information of the MTC UE;
the MTC GW is coupled with the mobility management network element and is configured to send the information of the MTC UE acquired from the mobility management network element to the MTC Server, wherein the MTC GW is configured to acquire the address of the MTC Server according to the information of the MTC Server and send the information of the MTC UE to the MTC Server;
the MTC Server is coupled with the MTC GW and is configured to receive the information of the MTC UE sent by the MTC GW.

16. The system according to claim 15, wherein the MTC GW is further coupled with the user subscription data repository and is configured to acquire the subscription data of the MTC UE or an address of the mobility management network element allocated to the MTC UE from the user subscription data repository.

17. The system according to claim 15, wherein the MTC GW is further configured to perform security verification for the MTC Server.

18. The method according to claim 1, wherein the mobility management network element comprises: a Serving General Packet Radio Service Supporting Node (SGSN) or a Mobility Management Entity (MME).

* * * * *